United States Patent
Sallier et al.

(10) Patent No.: US 7,777,647 B2
(45) Date of Patent: Aug. 17, 2010

(54) METHOD OF PROCESSING TOPOGRAPHIC DATA IN REAL TIME IN AN AIRCRAFT, IN ORDER TO DISPLAY SAID DATA

(75) Inventors: Aurélie Sallier, Toulouse (FR); Julia Percier, Cugnaux (FR); Nicolas Marty, Saint Sauveur (FR)

(73) Assignee: Thales (FR)

( * ) Notice: Subject to any disclaimer, the term of this patent is extended or adjusted under 35 U.S.C. 154(b) by 241 days.

(21) Appl. No.: 12/030,392

(22) Filed: Feb. 13, 2008

(65) Prior Publication Data

US 2008/0198041 A1    Aug. 21, 2008

(30) Foreign Application Priority Data

Feb. 13, 2007    (FR) ................................. 07 01029

(51) Int. Cl.
  *G01C 21/00*    (2006.01)
(52) U.S. Cl. .................... 340/978; 340/973; 701/301
(58) Field of Classification Search ............. 340/978, 340/973–975, 961, 970, 945; 701/4, 14, 701/301, 120; 342/65
   See application file for complete search history.

(56) References Cited

U.S. PATENT DOCUMENTS

| | | | | |
|---|---|---|---|---|
| 4,623,966 A | * | 11/1986 | O'Sullivan | 701/301 |
| 5,844,504 A | * | 12/1998 | Etherington | 340/973 |
| 6,122,570 A | * | 9/2000 | Muller et al. | 340/970 |
| 6,980,128 B2 | * | 12/2005 | Godard et al. | 340/945 |
| 7,363,156 B2 | * | 4/2008 | Winkler et al. | 701/301 |
| 2003/0107499 A1 | * | 6/2003 | Lepere et al. | 340/945 |
| 2007/0219705 A1 | | 9/2007 | Bitar et al. | |
| 2007/0250223 A1 | | 10/2007 | Francois et al. | |
| 2008/0039984 A1 | | 2/2008 | Bitar et al. | |
| 2008/0174454 A1 | * | 7/2008 | Bitar et al. | 340/975 |

FOREIGN PATENT DOCUMENTS

| | | |
|---|---|---|
| EP | 0 928 952 | 7/1999 |
| FR | 0 623 631 | 5/1989 |
| FR | 2 623 631 | 5/1989 |
| FR | 2 813 963 | 3/2002 |

OTHER PUBLICATIONS

Pending unpublished U.S. Appl. No. 11/683,989, filed Mar. 8, 2007, Lorido et al.

* cited by examiner

*Primary Examiner*—John A Tweel, Jr.
(74) *Attorney, Agent, or Firm*—Lowe Hauptman Ham & Berner, LLP

(57) ABSTRACT

The field of the invention is that of the display in map form of an operating zone of an aircraft on a screen, and more particularly a method of processing topographic data of this operating zone of an aircraft in real time, based on a calculation of radials (R) centred on a reference point (O) defining an angular segment of topographic data. According to the invention, the method includes a subdivision of the operating zone to be mapped into a plurality of angular segment sections, each forming an individual zone (3), and an assignment of a processing priority and a refresh frequency specific to each individual zone defined according to a criterion of operational interest of the element to the aircraft.

22 Claims, 7 Drawing Sheets

METHOD OF PROCESSING TOPOGRAPHIC DATA IN REAL TIME IN AN AIRCRAFT, IN ORDER TO DISPLAY SAID DATA

RELATED APPLICATIONS

The present application is based on, and claims priority from, French Application Number 07 01029, filed Feb. 13, 2007, the disclosure of which is hereby incorporated by reference herein in its entirety.

DOMAIN OF THE INVENTION

The present invention relates to a method of processing topographic data in real time in an aircraft in order to provide a map-type graphic display. It applies more particularly to the display of data on screens onboard the aircraft, in the onboard navigation aid systems.

The terms topographic or geographic data should be understood to mean data that can be presented in map form, and which corresponds to a measurement of an absolute or relative altitude type quantity, meteorological type information (atmospheric pressure for example) or any other similar information.

DISCUSSION OF THE BACKGROUND

The onboard navigation aid systems in aircraft these days routinely or obligatorily include ground collision risk warning systems, such as the TAWS system ("Terrain Awareness and Warning System"), which make it possible to drastically reduce the accident rate. Various TAWS type products are available on the market such as the EGPWS system (Enhanced Ground Proximity Warning System) marketed by Honeywell, or even the $T^2CAS$ system marketed by THALES in collaboration with L-3 communications. As a general rule, the main function of these systems is to signal the need to modify the path of the aircraft in the more or less short term, to avoid a collision with the relief or obstacles on the ground, or entry into an overflight-prohibition zone. For these purposes, they use an algorithm for predicting collisions with the ground according to a "terrain" or geographic environment of the aircraft that they must determine, and a prediction that they make concerning the path of the aircraft. The determination of the terrain environment is obtained by correlating the position of the aircraft calculated on the basis of the navigation parameters supplied by the onboard flight management system, notably heading, altitude, latitude, longitude, with a terrain elevation database. The prediction of the path of the aircraft is based on navigation parameters, in particular heading, altitude, latitude, longitude, vertical and ground speed, weight of the aircraft and flight profile models for the aircraft concerned. These monitoring systems supply in particular as output: graphic information to a navigation screen, making it possible for example to display in plan view a map of THD ("Terrain Hazard Display") type with relief zones by hazard levels indicated in false colours (green, red, etc.) and forecasts of possible conflicts with this relief; audio information to the audio system of the aircraft, to generate if necessary an audible alarm, typically an alarm message. FIG. 1 diagrammatically illustrates such a system. It uses information from a terrain elevation topographic database DB1, onboard or accessible onboard, and a database DB2 of vertical flight profiles of the aircraft concerned, and the various flight parameters P transmitted by the flight management system which will include (the list is not exhaustive): vertical and ground speeds, flight angles, latitude, longitude, altitude, radio-altitude, weight of the airplane and so on. The system mainly comprises three basic functions which feed input data to a collision prediction algorithm 1, which supplies as output in particular graphic display data representing THD ("Terrain Hazard Display") zones intended to be presented on a navigation screen ND of the cockpit or HSI ("Horizontal Situation Indicator"), control data to an associated control panel CP, and alarm data to the aircraft audio system AAS. These three basic functions are: a function 2 for determining the current position of the aircraft; a function 3 for predicting the flight profile in the near future, based on the current position determined by the function 2, and information from the database DB2; a function 4 for determining the relief of the operating zone of the aircraft, based on the current position determined by the function 2, and information from the database DB1.

These systems are well known to those skilled in the art and have demonstrated the benefit of their use in collision prevention.

In the invention, interest is more particularly focused on the graphic display of the cartographic data supplied by these systems on an onboard screen. This display is currently provided in a form identical to that obtained with a radar. The display devices used initially devolved in effect from meteorological radar systems, such as the WXR system, the commercial name of the product marketed by Rockwell Collins. These systems make it possible to determine meteorological conditions by means of a meteorological radar onboard the aircraft, and display map data of meteorological type. In this case, the navigation parameters are correlated with captured data and processed in real time by the meteorological radar.

The graphic display is thus provided in the form of radials. A radial corresponds to a direction of acquisition by the radar. It is represented by a line, whose origin represents the position of the aircraft and whose direction corresponds to the bearing angle between the directions of the aircraft and of the acquisition by the radar, by an aperture angle which defines the resolution of the information and by successive points on this line, displayed in false colours, which represent the values measured by the radar.

Although they do not use active sensors such as the meteorological radar, the TAWS systems, such as in particular the abovementioned EGPWS or $T^2CAS$, use this method of graphic display by radials: they calculate the points of the radials by scanning, in the manner of a radar, topographic data which is a digital representation of the terrain being flown over, extracted from or contained in a terrain elevation database which can be onboard, or downloaded by radio transmission as and when required according to the zones being flown over. Depending on the available display modes (rose, arc, etc.), false colours are used corresponding to relief altitude measurements, absolute or relative to the altitude of the aircraft. This display mode is standardized in official technical recommendations. For the TAWS systems, these technical recommendations are, for example, described in the certification document TSO-c151b, TSO being an acronym for "Technical Standing Orders". The mapping data obtained from applicable calculations implemented in these systems is structured in formatted frames compliant with the ARINC 453 protocol to be delivered to a graphic display management system.

This graphic display mode based on radials does, however, have some drawbacks, including:

the time to update a complete image, corresponding to a 360° sweep of the operating zone of the aircraft, is slow;
if the position of the aircraft is superimposed on the map background, the latter is offset relative to the position of the aircraft, an offset which is marked if the aircraft is accelerating or turning.

the display graphic data is not geographically referenced (or geo-referenced), for example with a latitude/longitude and an orientation relative to geographic north, because of the very nature of the radar-type sweep. It is only fixed relative to the origin of the radials, or the instantaneous position and orientation of the aircraft. It is thus difficult to superimpose on the map background image other graphic information, such as the flight plan. Now, research efforts are geared towards combining a variety of graphic information on the same navigation screen, to facilitate understanding by the pilots.

the position at the origin of each radial is no longer geo-referenced. For these reasons, it is not possible to follow in real time the path of the aircraft: it is not possible to have the radials rotated or shifted with the aircraft. The next update of the radials must be awaited. The effect induced is a "fixedness" of the screen background displaying the map (the relief), while other graphic elements follow the movement of the aircraft, in particular the flight plan. There is therefore a display inconsistency with a delay effect. This effect can be mitigated by increasing the update frequency, but this incurs a cost overhead in time and computation resources.

the minimum resolution of the system that supplies the map data to be displayed is defined relative to the maximum range of the radials, which, for a given range, and a given application system, defines the angular aperture of the radials and the size of the points on each radial. Thus, in a given operational situation, the size of the points along the radials and the angular aperture of the radials are constant. FIG. 2a represents a radial R. The angular aperture $\alpha$ of the radial defines for each point $p_i$ a small zone roughly similar to a trapezoid shape t (the edges of the "trapezium" t here being arcs of circles), on which a hazard level is calculated, typically the highest altitude on said trapezium. The angular aperture $\alpha$ also corresponds to the angular difference between two successive radials, that is, it defines the angular sampling of a segment. FIG. 2b illustrates a set of radials of origin O with a constant angular aperture $\alpha$, which digitizes a part of the space surrounding the aircraft. If this angular aperture is large, a point $p_i$ near the origin O will be calculated several times, for example it will be calculated for the radials $R_5$, $R_6$, $R_7$ . . . , as illustrated in FIG. 2b which for example represents a forward segment. At the extreme, the point at the origin O is calculated and displayed for each radial. This implies an overhead in time and computation resources to calculate the radials and display them.

a data conversion is needed to switch from the "radial" type map information format, with points as polar coordinates relative to a point of origin, to a "map" type display format in a discretized space with pixels as Cartesian coordinates. This conventionally introduces graphic artifacts, in particular moiré effects.

Thus, there is a need to enhance the display of the so-called map data, to make it possible to better follow the movement in real time of the aircraft, with an enhanced visual rendition, and to make it possible to display on one and the same screen graphic information obtained from different applications, coherently, while optimizing the necessary computation times and resources.

In the state of the art, all of the 360° convolution zone around the aircraft is calculated. Typically, in a TAWS system, almost 400 radials are calculated corresponding to an image, requiring 100 real time cycles of the associated computer for a complete refresh. In practice, this represents two to four seconds.

SUMMARY OF THE INVENTION

The general idea on which the invention is based is to limit the analysis to a finite number of individual zones which are refreshed at different frequencies according to an operational interest, which makes it possible, for strategic zones, to calculate the associated radials at high frequencies and processing priorities, whereas other lower priority zones will be refreshed at slower frequencies. In this way, the computation time is optimized. These individual zones are obtained by cutting up the operating zone to be mapped into sections of angular segments.

Thus, the technical problem raised is resolved in the invention by an optimized radial-type display method, in which the operating zone of the craft to be displayed is subdivided into individual zones of angular segment section type and in which each individual zone has associated with it an update frequency and a processing priority.

According to one aspect of the invention, to maintain the consistency of the graphic information displayed and refreshed at different frequencies, the calculation of an individual zone has incorporated in it the calculation of a zone overlapping other individual zones so as to provide data according to the estimated movement of the aircraft between two refresh cycles.

According to another aspect of the invention, there is defined, for each individual zone, an angular aperture of the optimized radials, according in particular to its range and the resolution sought on said zone. It is thus possible to optimize both the processing and display time and the resolution. In all cases, it is thus possible to keep an optimum resolution in all the individual zones, while optimizing the computation times and resources according to their respective ranges.

The individual zones can be geo-referenced, by using the aircraft positioning and orientation data which is obtained by consolidating all the information sources available onboard the aircraft. For example, there is supplied, for each calculated radial, its angular orientation relative to geographic north. In another embodiment, it is possible to geo-reference the very geometrical form of the individual zones. In practice, they have a simple geometry, of polygon type, roughly triangular or trapezoid, which can be described by geo-referenced coordinates of their peaks: three points for a triangular angular segment section or four points for a trapezoid section. For each of these points, it is possible for example to transmit, in the display data frames, their altitude and their longitude. In this way, a suitable graphic display system can manipulate these simple, triangular or trapezoid geometrical shapes geo-referenced by the peaks. It is also possible to describe the angular segment sections by the three peaks of the triangle including the radial and the distances between which the topographic data is calculated. Innovative display systems are in practice emerging which are capable of directly plotting such polygons to approach the forms of the initial radials. These systems can transform the graphic data to be presented into textures which can be likened to small images with false colours, which can be flattened and stretched on the defined polygons, using a graphics generation processor. By these means, the graphic artifacts are advantageously eliminated.

A method according to the invention makes it possible to refresh the displayed image only by individual zones, according to their update frequency, while remaining synchronous with the rest of the image: there is no point in each time supplying all the points of the operating zone to be mapped: there is less information to be processed and to be displayed. Furthermore, since the transmitted individual zones are fixed in a single terrestrial reference base (geo-reference of the origin and heading of the aircraft), and the display device used to represent them is fixed in an aircraft fix, said aircraft fix being mobile relative to the fixed terrestrial fix, then the movement of the aircraft induces a movement and a rotation of the map screen background in real time with the movement of the aircraft, such that the display effect or fixedness of the screen background observed in the systems of the state of the art is eliminated. It furthermore makes it possible to display in real time, in a geographically coherent manner on one and the same navigation screen, other geo-referenced graphic information such as the flight plan.

The definition of the individual zones, their update frequency and their priority are advantageously variable, according to the operational situation of the aircraft. In particular, if the speed of movement of the aircraft increases or reduces, the update frequency can be adapted; if the aircraft turns, the angle associated with an element can be widened within the turn to increase the number of radials within this turn; furthermore, it is possible to calculate a geometrically larger element so as to gather information in advance concerning the predicted movement of the aircraft, which makes it possible to have in advance geographic data relating to the future overflight zone of a given geographic element. This is very useful in the case where the airplane increases its speed or begins a turn.

The invention therefore relates to a method of processing map data in real time in an aircraft, to display it in the form of a map of the operating zone of the aircraft on a screen, said processing method comprising a calculation of radials centred on a reference point defining an angular segment of topographic data, characterized in that said method comprises:
- a subdivision of the operating zone to be mapped into a plurality of sections of angular segments, each section forming an individual zone to be mapped,
- an assignment of a priority and of a refresh frequency specific to each individual zone defined according to a criterion of operational interest of said element to the aircraft.

It applies to the display of map data obtained by acquisition of radials. It applies to the integrated monitoring systems, of the radial computation type, and in particular to the TAWS or WXR monitoring systems.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The figures show subdivisions and any numerical indications are only examples, given by way of indication. The invention is not limited to just these examples.

Figure 1:
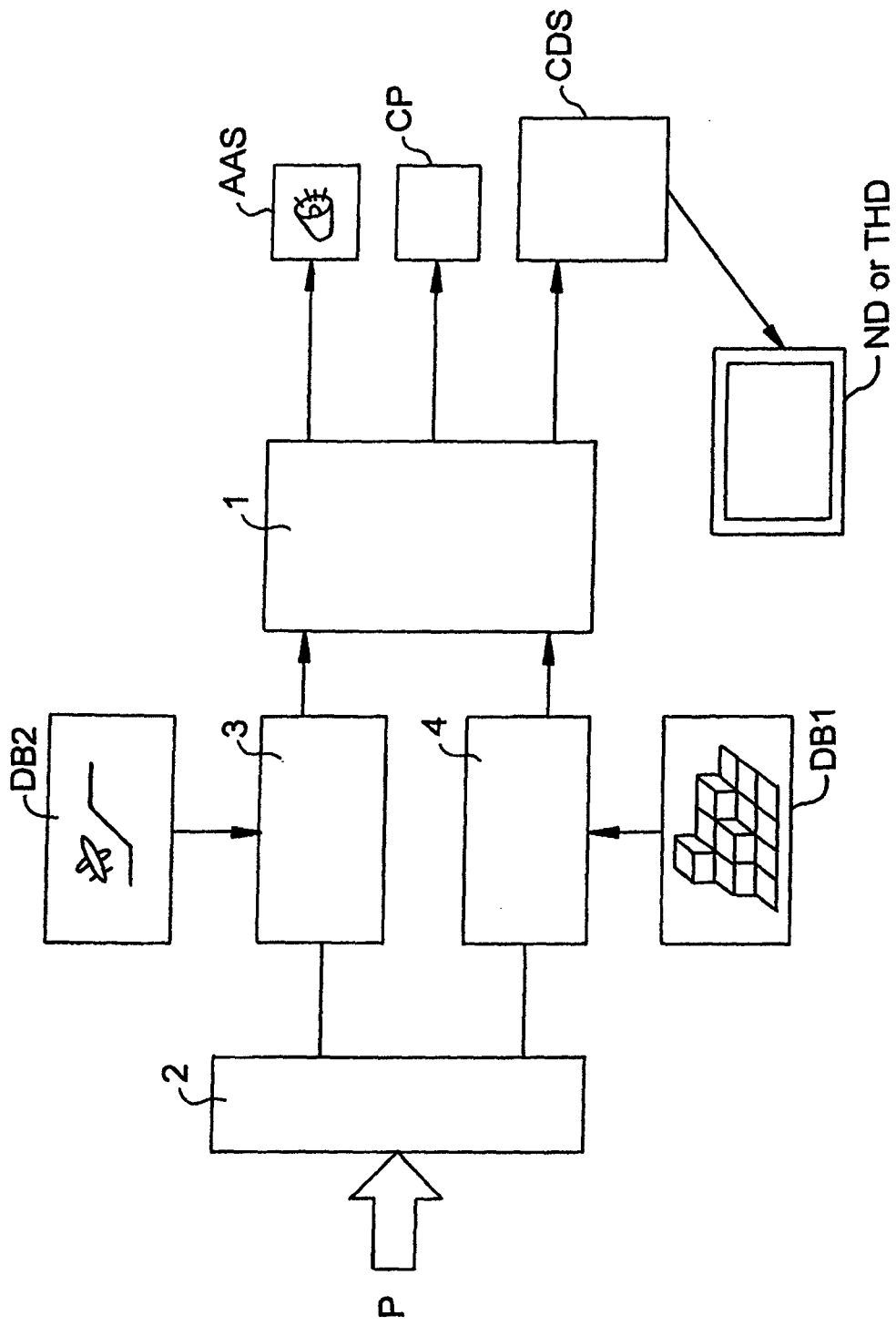
FIG. 1, already described, is a block diagram illustrating an integrated monitoring system of TAWS type.
Figure 2A:
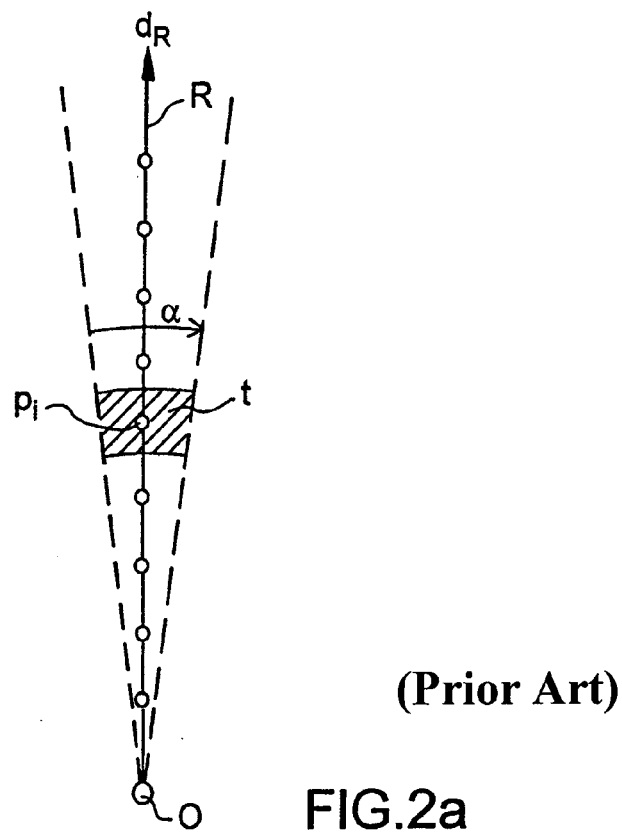
FIGS. 2a and 2b, already described, illustrate the digitization of the data by radials.
Figure 2B:
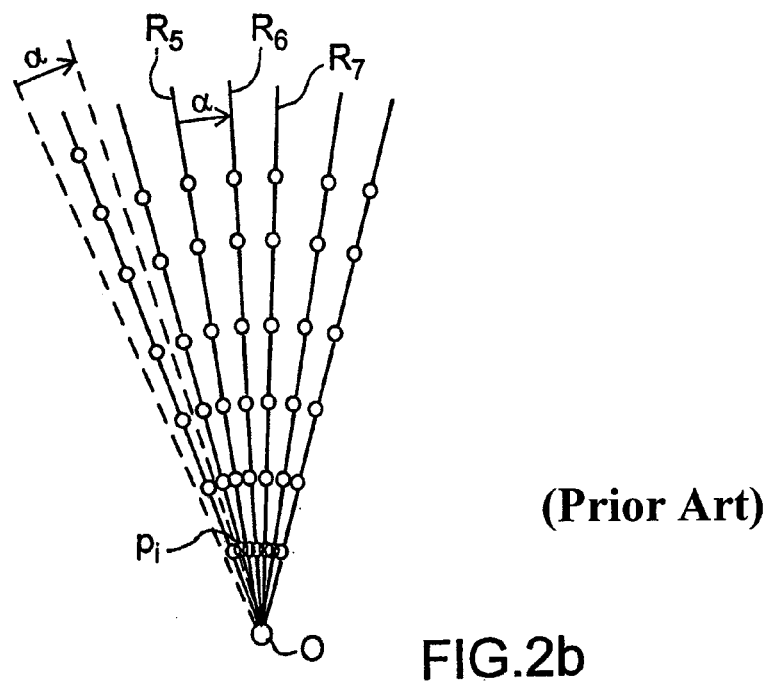
Figure 3A:
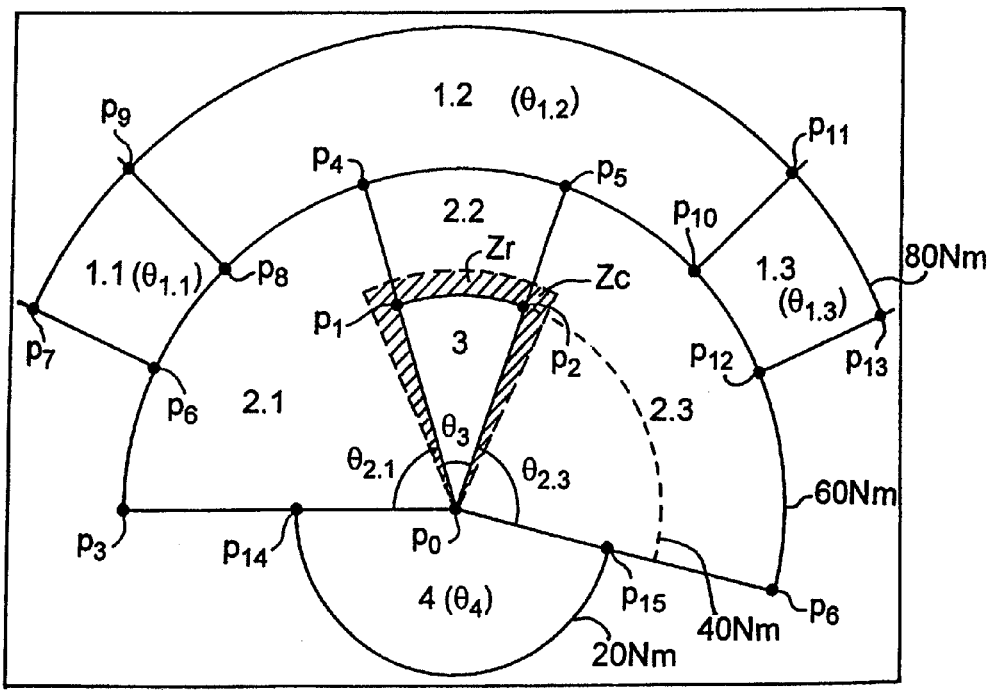
FIG. 3a is a first example of subdivision into geometric elements according to the invention, in an exemplary straight-line flight.

FIG. 3a gives a first example of a subdivision of an operating zone of an aircraft A into individual zones according to the operational interest of these individual zones, according to a method according to the invention.

The operational interest of an individual zone depends on different factors, including: the movement of the aircraft in a straight line (speed of movement) or in a turn (angular rotation speed), the situation in relation to the aircraft, front, back or side, the distance in relation to the aircraft.

These various aspects are taken into consideration together in combination, to determine an appropriate subdivision, according to different criteria. Among these criteria, the following criteria can be mentioned, in relation to FIG. 8a:

- The bearing angle φ of a radial R with the current direction $d_A(t)$ of the aircraft. For example, the radials far removed from the direction of movement of the aircraft are assigned a lower update frequency and priority.
- The distance of a given point of the radial relative to the origin O, corresponding to the position of the aircraft or a reference position. For example, the most distant points are assigned a lower update frequency and resolution.
- The presence or absence of alerts (alarming closeness of the relief, or of a prohibited overflight zone). For example, in the case of an alert, the update frequency of the radials in the direction of movement of the aircraft is increased.
- The subdivision into successive sections of angular segments along the radials, to optimize the angular aperture of the radials according to the maximum range in each of the sections, according to the criteria of the application, while ensuring that all the information is presented and that the associating processing cost is reduced.
- The speed of movement of the aircraft. For example, the update frequency in the direction of movement of the aircraft increases with the speed in order to retain an image in front of the aircraft whose "delay" in relation to the outside world is as low as possible given the resources allocated.

The angular rotation speed of the aircraft. For example:
  When flying in a straight line, the radials in the direction of movement of the aircraft are updated more frequently;
  When flying in a turn, the radials within the turn are updated more frequently and with a higher priority compared to other processes.

The example of FIG. 3a covers an aircraft moving in a straight line. There is, for example, an interest in having information up to 80 nautical miles in front of the aircraft. However, there is no point in covering these 80 nautical miles over 360° around the aircraft. According to the inventive method, the observation zone is subdivided into individual zones, according to their operational interest. The example considers ranges of 20, 40, 60 and 80 nautical miles (Nm), which are represented in broken lines in the figure by circles of origin O (point $p_0$), corresponding to the current position of the aircraft, or a reference point.

A first individual zone 3 corresponds to a triangular section of front angular segment of angle $\theta_3$. It covers the distance from the aircraft taken as the point of origin $p_0$ (which defines the minimum range=0 nautical miles of the radials which will be calculated for this zone 3), to 40 nautical miles (which defines the maximum range of the radials which will be calculated for this zone). In this example illustrating a straight-line flight situation, the centre of this angular segment corresponds to the current direction $d_A(t)$ of the aircraft, so as to sweep an equal angular segment either side of this direction.

This individual zone 3 can be geometrically defined by the polar coordinates of three points corresponding to the peak of the triangle: $p_0$, the origin point, and $p_1$ and $p_2$ on the 40 Nm circle, such that $\overline{p_1 p_0 p_2} = \theta_3$. From the geo-referenced coordinates of the position of the aircraft, it is easy to calculate the geo-referenced coordinates of the points $p_0$, $p_1$ and $p_2$, so as to obtain a geo-referencing of the geometrical element (triangle) of this zone. It is even possible to geo-reference each of the radials calculated for this zone 3, by giving its bearing angle relative to geographic north (see FIGS. 8a and 8b described hereinbelow). Thus, the calculated values for this zone 3 can be displayed in a universal geo-referencing coordinates system. It has also been seen how, in the case where the geo-referenced description of the geometrical shape is transmitted, namely, in this case, the coordinates of the three peaks, a suitable graphic system can then use a graphics processor to process the display of these simple geometrical shapes and the display of textures corresponding to the calculated topographic values which then makes it possible to advantageously eliminate graphic artifacts. These display and geo-referencing aspects apply to each of the individual zones defined according to the invention.

The individual zone 3 is in practice a high-interest operational zone, being in the forward segment close to the aircraft. It therefore has data processing priority and must be refreshed at the highest available frequency.

In the 60 nautical mile zone (one nautical mile or 1 Nm, which is the unit routinely used in aeronautics, is equal to 1852 metres), three other individual zones are defined: two individual zones 2.1 and 2.3 either side of the individual zone 3 covering a lateral zone from 0 to 60 nautical miles; and an individual zone 2.2 in extension of the zone 3 to cover the 40 to 60 nautical mile zone in the same angular segment.

The individual zones 2.1 and 2.3 are angular segment sections, each defined, as for the individual zone 3, by three points (triangular): the origin point $p_0$ and two points on the 60 nautical mile circle, $p_3$ and $p_4$ for the zone 2.1 to the left of the individual zone 3, and $p_5$ and $p_6$ for the zone 2.3 to the right of the individual zone 3.

The individual zone 2.2 is a trapezoid section of the angular segment of angle $\theta_3$. Its geometrical surface area is defined by the four points $p_1$, $p_2$, $p_4$, $p_5$, for example. In another example, the geometrical surface area of the individual zone 2.2 can be defined by $p_0$, $p_1$, $p_2$, and the section start and end distances.

Beyond 60 nautical miles, in the zone forward of the aircraft, three individual zones are defined, 1.1, 1.2 and 1.3. The zone 1.2 in the centre covers an angle $\theta_{1.2}$ that is wider than the angle $\theta_3$ of the zone 3. The two zones 1.1 and 1.3 are positioned respectively to the left and to the right of this zone 1.2, each covering an angle $\theta_{1.1}$ and $\theta_{1.3}$. The zones 1.1 to 1.3 are each a section of an angular segment centred on the origin $p_0$, with a corresponding segment angle. They can each be described by four points (trapezoid type): two points on the 60 nautical mile circle and two points on the 80 nautical mile circle, or in the example: $p_6$, $p_7$, $p_8$ and $p_9$ for the zone 1.1, $p_{10}$, $p_{11}$, $p_{12}$ and $p_{13}$ for the zone 1.3, and $p_8$, $p_9$, $p_{10}$ and $p_{11}$ for the zone 1.2.

In this example of movement of the aircraft in a straight line, these two angles $\theta_{1.1}$ and $\theta_{1.3}$ are equal. The total coverage angle corresponding to the set of zones 1.1, 1.2 and 1.3 and equal to $\theta_{1.1} + \theta_{1.2} + \theta_{1.3}$ is less than the angle corresponding to the set of zones 2.1, 3 and 2.3 and equal to $\theta_{2.1} + \theta_3 + \theta_{2.3}$. In practice, at a great distance from the aircraft, beyond 60 nautical miles in the example, it is not in practice very interesting or strategic to have a lateral coverage that is as wide as when close to the aircraft: if the aircraft changed heading, the capturing and processing of distant lateral data would be pointless; if the aircraft continued its route without changing heading, it would be early enough to have this lateral information when it is closer, at under 60 nautical miles.

A final individual zone 4 corresponds to a backward zone, that is behind the airplane, corresponding to a zone that has already been flown over or at the end of overflight. There is no need to observe this zone over a great distance. In the example, this zone 4 corresponds to an angular segment covering a distance of 20 nautical miles relative to the current position of the predefined aircraft, taken as the origin, of angle $\theta_4$ covering the angular space between the two zones 2.1 and 2.3. It can be geometrically defined by three points (triangular): the point at the origin $p_0$, and the two points $p_{14}$ and $p_{15}$ on the 20 nautical mile circle.

Thus, according to the invention, the operating zone around the aircraft is covered over 360°, but subdivided into individual zones. Each individual zone can be described by a description of the radials to be calculated in this zone, or by the coordinates of the peaks of its geometrical figure.

These individual zones make it possible to cover a greater or lesser distance in relation to the aircraft, and with refresh cycles and a processing priority dependent on the operational or strategic interest of the zone.

In the forward segment, the zone 3 is assigned the highest priority and the highest refresh frequency. The zones 2.1 to 2.3 have a medium priority. There is an interest in applying a higher refresh frequency to the zone 2.2 that is in continuity of the zone 3, and in the direction axis of the aircraft, than to the lateral zones 2.1 and 2.3.

The zones 1.1 to 1.3, and the backward zone 4, have a low priority. There is an interest in applying a higher refresh frequency to the zone 1.2 in the direction axis of the aircraft, than to the lateral zones 2.1 and 2.3.

In one example, the following processing periods and priorities are thus assigned to the individual zones that have just been described:
Zone 1.1: period 2.5 s; LOW priority
Zone 1.2: period 1.5 s; LOW priority
Zone 1.3: period 2.5 s; LOW priority
Zone 2.1: period 1.5 s; MEDIUM priority
Zone 2.2: period 1 s; MEDIUM priority
Zone 2.3: period 1.5 s; MEDIUM priority
Zone 3: period 500 ms; HIGH priority
Zone 4: period 2.5 s; LOW priority Advantageously, such a subdivision with a view to processing that is specialized in period and priority terms according to the individual zone concerned makes it possible to calculate an angular aperture α of radials that is optimized in each zone. This angular aperture is normally fixed, in a given operational situation, typically for a given viewing distance to be displayed on the screen, and a graphic resolution associated with this viewing distance. This dictates the angular radial aperture α, as illustrated in FIGS. 5a and 5b which show how to calculate the minimum distance between two successive points on one and the same radial.

In these figures,
APErad denotes the angular aperture in Radians (Aperture in radians);
RESmin denotes the minimum resolution of the information, defined by the application;
GSmax designates the maximum ground speed of the airplane (Ground Speed max), (airplane flight parameters);
LENsensor denotes the length of the sensor of the application concerned (for example, a TAWS application);
GSmax.LENsensor gives the viewing distance or maximum range, relative to the origin $p_0$;
LATmax denotes the maximum latitude, which is airplane flight parameter data;
PITCH denotes the minimum distance between two successive points on a radial.

Figure 5A:
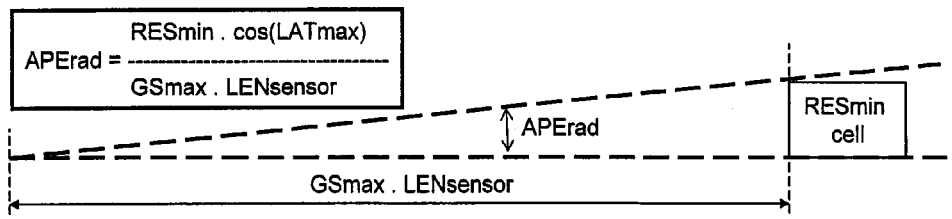
FIGS. 5a and 5b detail the principle of determining the angular sampling according to the most distant point of the geometrical element concerned.
Figure 5B:
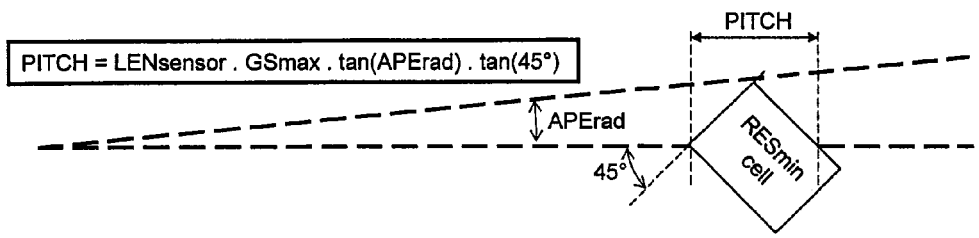

For given values of RESmin, LATmax, GSmax, and LENsensor, the angular value of a set of radials forming an angular segment as illustrated in FIGS. 5a and 5b can be determined.

In these figures, the minimum resolution of the information is represented by "rectangles" which are positioned so as to have, for given values of APErad and PITCH, respectively a maximum angular aperture and a minimum distance which are the optimum conditions required.

Figure 4:
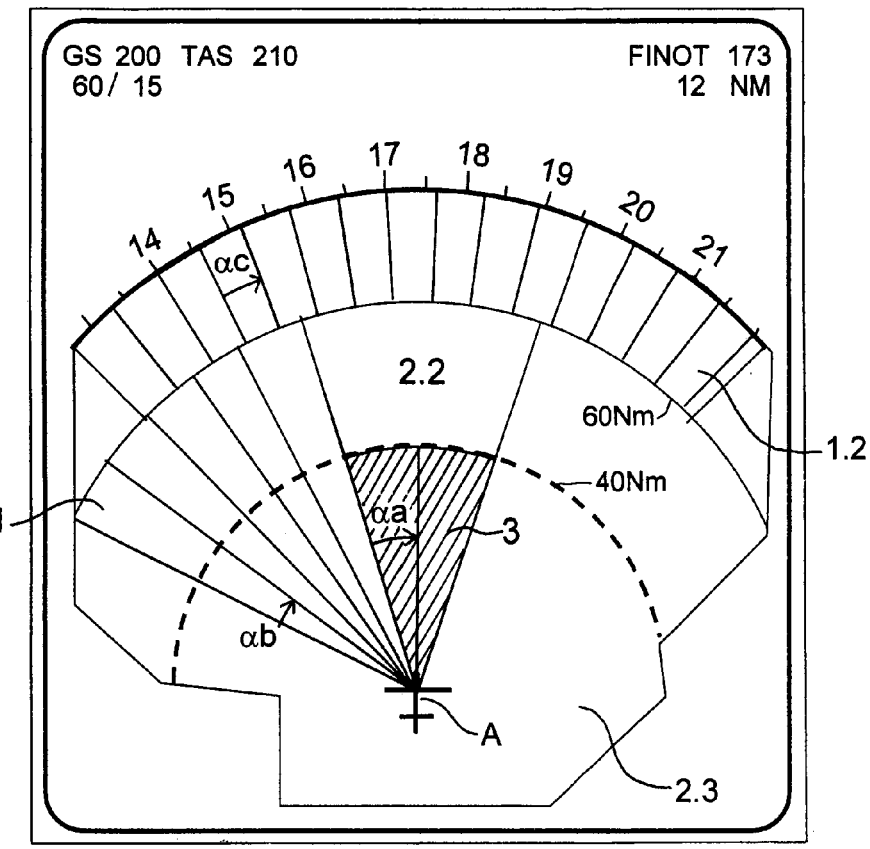
FIG. 4 details the definition of the parameters of the different geometrical elements of FIG. 3a, in particular their angular sampling.

In the invention, this criterion is no longer applied to a single angular segment equal to the operating zone detected by the sensor of the application concerned, but to as many angular segment sections having different ranges, corresponding to the individual zones defined according to the invention. For each individual zone, optimum detection conditions are obtained. In particular, if a constant minimum resolution RESmin is chosen on all the angular segments, for example a resolution of 15" (arc seconds), the angular aperture α of the radials will be wider in the individual zones close to the current position $p_0$ of the aircraft such as 3, and narrower for the distant zones such as 2.1, as illustrated in FIG. 4, using αa, αb and αc to denote the respective angular apertures of the zones 3, 2.1 and 1.2.

With constant information resolution RESmin, a reduction of the viewing distance (maximum range) thus makes it possible to increase the angular aperture of a radial, without losing information in the display. In other words, an angular sampling is performed that is adapted to each individual zone, according to the resolution sought at its most distant point (at maximum range), guaranteeing that all the information is presented and that the associated processing cost is reduced.

A choice can be made to apply different minimum resolutions according to the individual zones concerned. In this case, for each individual zone, the chosen minimum resolution value and the distance of the angular segment to the origin $p_0$ must be combined to determine the corresponding minimum angular value.

It has been seen that the definition criteria of the different individual zones can vary according to the flight parameters of the aircraft. For example, depending on whether the speed of movement increases or reduces, the viewing distance of the zone can vary: depending on the case, the points on the limiting circle defining the maximum range of the area concerned is modified: if moving faster, there is need to see further, and the circle is moved further away; for example for the zone 3, the maximum range circle can move from 40 to 50 Nm for example; if the speed is reduced, the opposite applies.

Figure 6:
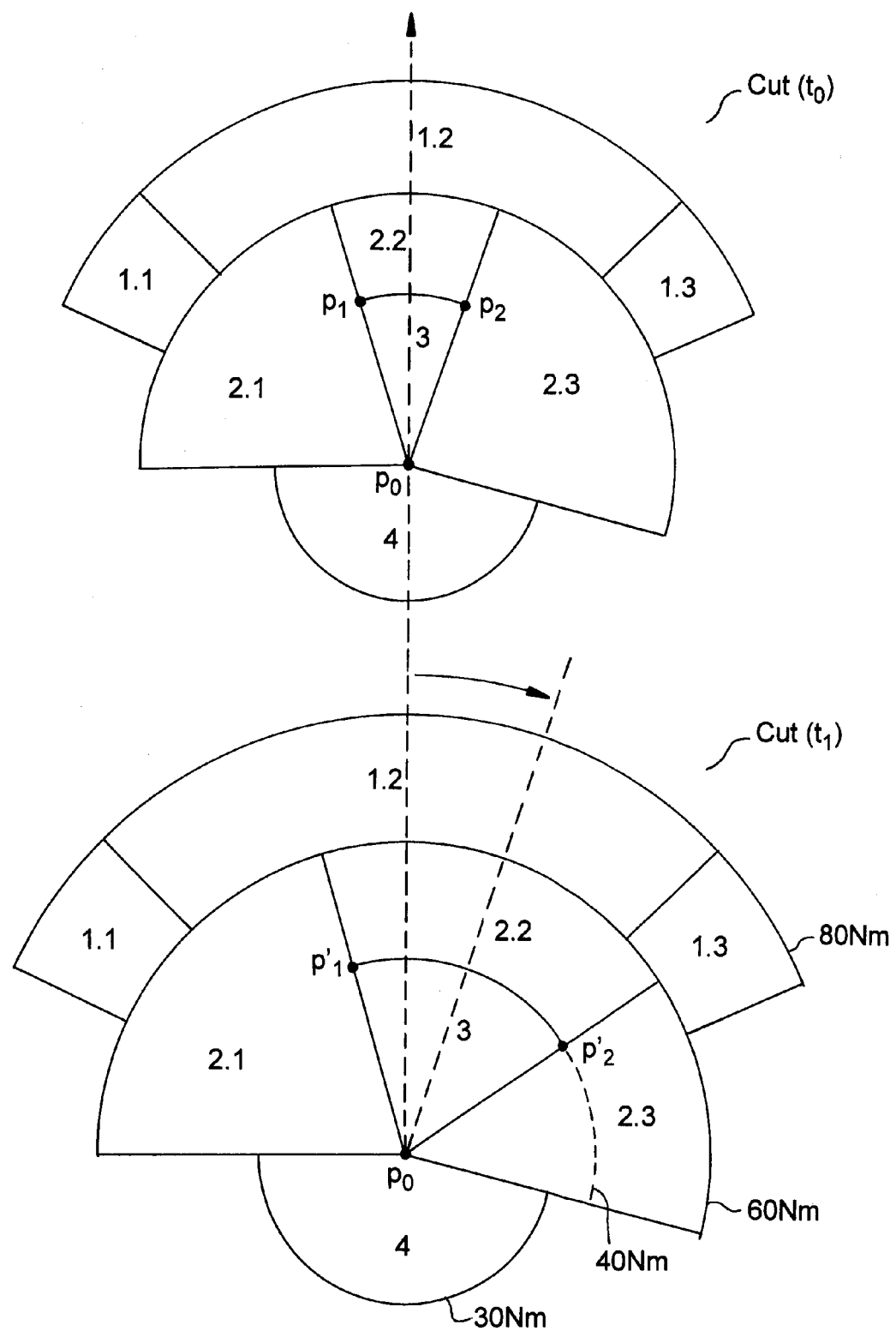
FIG. 6 illustrates a redefinition of the subdivision according to flight parameters, for a calculation in right-turn mode.

In another example, the angular rotation speed of the aircraft influences the limits of the individual zones. FIG. 6 illustrates an example of change of heading with a right turn. In this case, and given that the different individual zones are not refreshed at the same frequency, it is important to have more information in the direction of the change of heading: in other words, there is an interest in increasing the processing frequency of the radials within the turn. In the example, this is equivalent to widening the zone 3 to the right, therefore increasing its angle to the right to cover the zone within the turn, towards which the aircraft is maneuvering. If the subdivision Cut(t0) corresponding to FIG. 3a is taken, the new subdivision Cut(t1) amounts to moving the line $p_0$, $p_2$ (FIG. 3) which defines the right limit of this zone 3, to $p_0$, $p_2'$, further to the right: in other words, the individual zone 3 is widened to the right and oriented according to the speed of change of heading. This modification affects zones adjacent to the zone 3: the zone 2.2 is widened in the same proportions, the zone 2.3 is reduced.

Moreover, in order to anticipate the movements of the airplane: speed, heading, etc., a geographic overlap is provided between the different individual zones to be calculated: as illustrated in FIG. 3a for the individual zone 3, the effective calculation zone Zc of an individual zone is greater than this individual zone, which amounts to calculating radials either side of the individual zone concerned, or radial points beyond the maximum range defined for the individual zone concerned, in order to provide for this individual zone data in geographic overlap zones between individual zones. In FIG. 3a, a calculation zone of the zone 3 is delimited by broken lines. The shaded zone represents the overlap zone provided. In other words, data predicting the estimated future movement of the aircraft is calculated in advance, between two refresh cycles of the individual zone concerned. The definition of this geographic overlap varies with the flight parameters of the aircraft and is defined by the application concerned. In particular, it increases with the speed of movement or the angular rotation speed of the aircraft, in such a way as to ensure that, during an update period of this zone, the aircraft will not have traveled more than the provided overlap distance. The data of the individual zones and the overlap zones can then be concatenated.

Thus, at any moment, the subdivision method according to the invention supplies graphic display data to a display system, making it possible to follow the aircraft in real time, with the data on the image being highly consistent.

Figure 7:
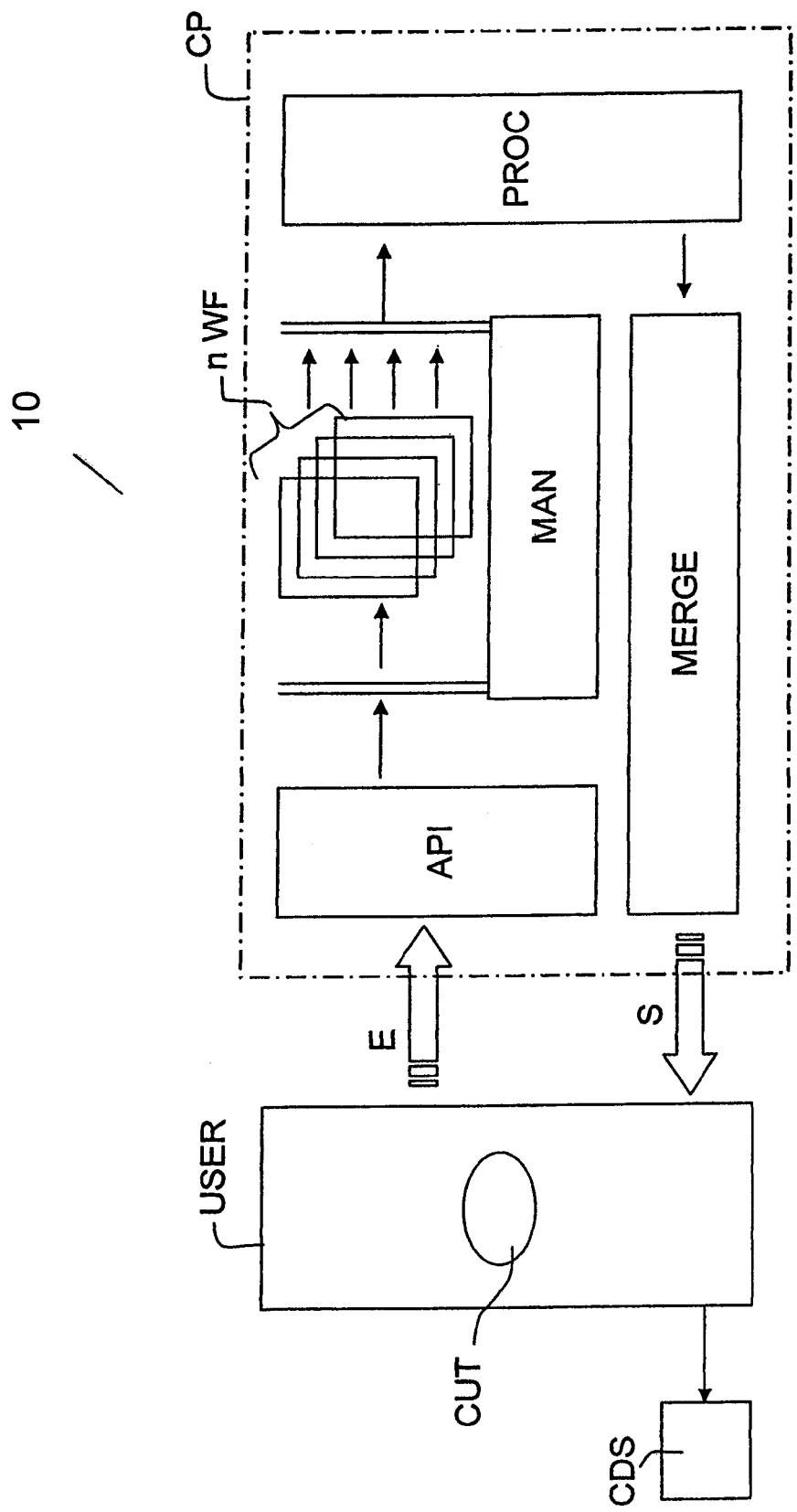
FIG. 7 is a block diagram of the different elements of the architecture of a data processing computer, with acquisition and presentation of the data for display, suited to a method according to the invention.

In practice, as illustrated in FIG. 7, a method according to the invention is implemented in a real-time computation system 10 onboard the aircraft, controlled by a corresponding monitoring application denoted USER, for example an application of TAWS, WXR, or other type.

The real-time computation system is typically a computer CP, dedicated or not to the application, onboard the aircraft. It typically comprises a real-time data processor PROC, which performs the various calculations needed to supply the geographic graphic information required by the application concerned, under the control of a real-time monitor MAN, which manages the tasks to be performed according to their defined priorities and frequencies. This management is typically handled by means of FIFO queues, according to requests E that the monitor MAN receives from the application USER via a user interface API.

According to the description of an individual zone for which a request is received, which defines a geographic zone to be mapped (preferably including the geographic overlap), the monitor MAN will subdivide this zone into calculation elements defining individual actions. For example, it will subdivide the zone 3 into six calculation elements, of identical frequency and priority, each corresponding to a queued task. A task corresponds in practice to the calculation of the radials or of a set of determined radials, depending on the imposed resolution.

The n queues WF (for example FIFO-type queues, or other storage structures: lists, stacks, arrays, etc.) are managed according to their associated refresh frequency and priority. For example, if the example given previously of assignment of priority and frequency to each individual zone is used, the monitor can initialize n=10 queues: a "0.5 s" and max priority queue for the zone 3 calculation; a "1 s" and medium priority queue for the zone 2.2 calculation; three "1.5 s" queues for the zone 2.1, 2.3 and 1.2 calculation, with equal medium priority for the two first zones and with a low priority for the zone 1.2; three "2.5 s" queues for the zone 1.1, 1.3 and 4 calculation with equal low priority.

With equivalent refresh frequency, the priority allotted to each queue makes it possible to determine at any instant the order of processing of the tasks.

The MERGE component concatenates the available graphic information for a given individual zone, according to the subdivision into individual actions applied as appropriate for this individual zone by the monitor MAN and taking account of any overlap data provided, to supply it as output S to the application USER which has made the request. Typically, this component supplies the data in the form of radials, digitizing the requested geographic zone.

To give more detail, the subdivision method CUT according to the invention is implemented by the application USER itself, according to criteria that it establishes, and which depend on the application USER (APPLI) and the operational situation.

The term "operational situation" should be understood to mean primarily the display context selected at the instant t: display mode (rose, arc, etc.), the selected display range (maximum distance of the last point to be displayed on the screen): typically, it can vary from 1 Nm to 1000 Nm, depending on the current state of the art, according to the airplane context (straight line, turn in progress), and so on.

The operational situation also includes the fact that the application USER is or is not in alert mode, that is, for example, that it has already detected hazardous relief zone approach conditions, or prohibited zone entry conditions, which can affect the subdivision, the periodicity or the priority of the individual zones.

This application USER supplies the real-time computation system 10, via the interface API, with configuration parameters that describe the geographic subdivisions that it performs, namely, typically description parameters of the radials to be calculated for each of the individual zones, with the relative calculation periods and priorities of the associated processing operations. It is possible, for example, to define each individual zone by giving, in an associated description, the origin of the radials, their minimum and maximum ranges, which defines the geometrical shape: a triangular angular segment section (with minimum range=0) or a trapezoid angular segment section (minimum range≠0), and, for example, the bearing angle of the first radial and of the last radial to be calculated, relative to a reference direction (typically, the current direction of the aircraft), which defines the position of the geometrical shape, or the (polar) coordinates of the points at the peaks of the geometrical shape concerned.

The description supplied by the application USER comprises a similar description of the associated calculation zone or of the overlap zone.

Figure 8A:
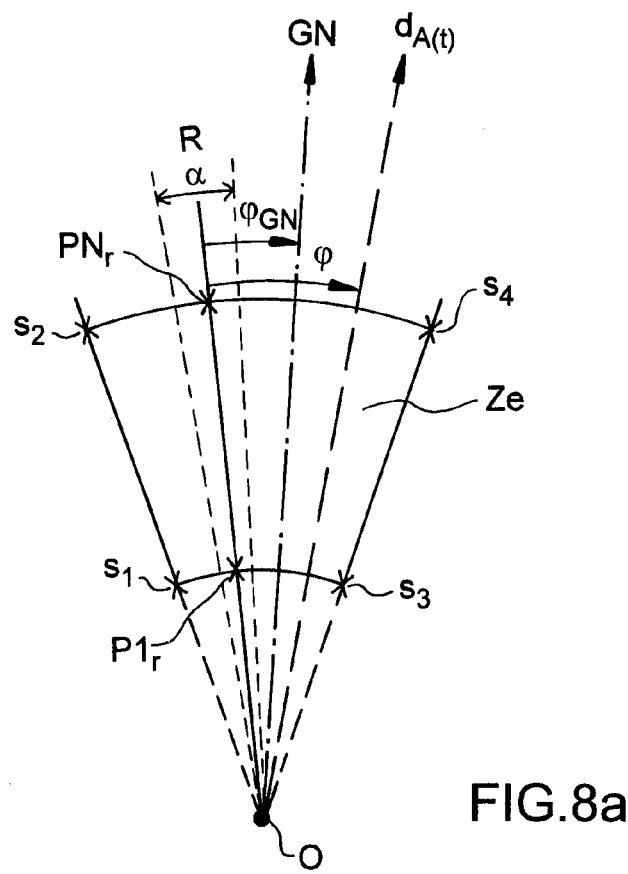
FIGS. 8a and 8b illustrate the configuration parameters given in the requests E and the output data S transmitted in response.
Figure 8B:
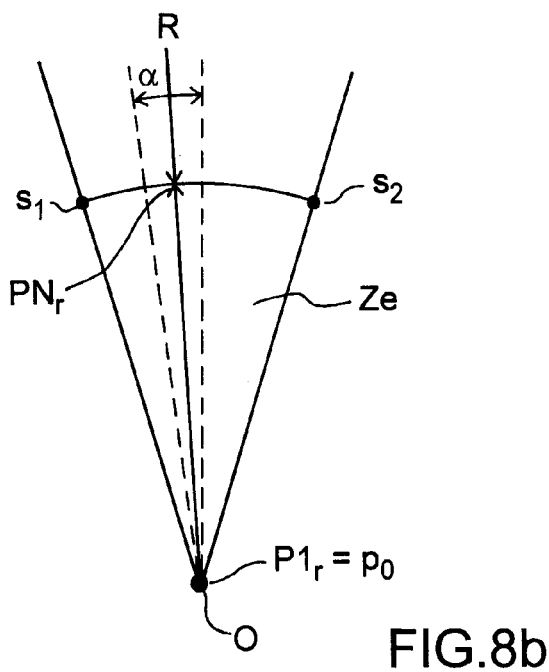

More specifically, in a non-exhaustive example of implementation of the method, for each individual zone resulting from the subdivision made according to the invention, the application USER can supply the interface API with parameters comprising in particular the following configuration parameters, with reference to FIGS. 8a and 8b:

- the common origin O of the radials, that is, the position $p_0$ of the aircraft or more generally a reference position common to all the radials
- the angular aperture $\alpha$ of the radials
- the number N of points on the radials
- the distance of the first point $P1_r$, calculated relative to the origin (or minimum range)
- the distance of the last point $PN_r$, calculated relative to the origin (or maximum range)
- the calculation periodicity (or frequency)
- the calculation priority.

FIG. 8a illustrates the case of a trapezoid section, such as the zone 2.2 of FIG. 3a. FIG. 8b illustrates the case of a triangular section, such as the zone 3 of FIG. 3a. In this case, the distance to the first point relative to the origin O is zero.

In a practical example, for a given straight-line flight situation, the following values can apply for the configuration parameters, with the priority scored on a scale from 1 to 3 in ascending order of priority:

For the individual zone 3 (FIG. 8b):
Origin: Aircraft position
N=N1
Angular aperture $\alpha$ of the radials: 4.5° for example
Distance of the 1st point $P1_r=p_0$ calculated on a radial: 0 Nm
Distance of the last point $PN_r$ calculated on a radial: 10 Nm
Calculation periodicity: 500 ms
Calculation priority: 3 (=maximum).

For zone 1.2 (FIG. 8a):
Origin: Aircraft position
N=N2
Angular aperture of the radials: 0.3° for example
Distance of the 1st point $P1_r$ calculated: 40 Nm
Distance of the last point $PN_r$ calculated: 160 Nm
Calculation periodicity: 2.5 s
Calculation priority: 1 (=not priority).

In practice, it can be seen that with identical terrain model resolution, the near zones allow for rougher angular resolutions.

In the example given above, if we take 0.3° at 160 Nm (1500 m), this allows for an angle of 4.8° over the first 10 Nm (tan(angle)=1500 m/10 Nm).

The interface API transmits to the monitor MAN these various configuration parameters in the form of requests, which describe the radial calculations to be performed, the calculation periods of each of the individual zones and the relative priorities of the associated processing operations.

The monitor MAN manages in real time these multiple requests sent via the API according to the different configuration parameters, and initializes the corresponding processing operations in FIFO queues which store the individual actions to be managed for each individual zone. Thus, the monitor MAN is responsible for converting the requests addressed to the interface API into processing operation requests to PROC periodically and according to various priorities, via the appropriate queue management, that is, an individual initialization of each request received in the queues: subdivision of the individual zone, resolution, periodicity and priority for the individual zone corresponding to the request, and modification of this initialization data according to new requests transmitted by the interface API, according to criteria (alert criteria for example) specific to the envisaged application USER, or dynamic criteria linked for example to the flight parameters (speed of movement, angular speed, etc.).

The monitor MAN thus appears as the functional core, making it possible to implement the subdivision method according to the configuration parameters transmitted by the application USER. In practice, it is adapted according to the envisaged application USER, in order to meet the operational needs while optimizing the processing operations and the resources used.

On completion of the processing operations, for each request corresponding to an individual zone sent to the display device (such as the zone 3 for example), the output interface MERGE supplies corresponding data as output S for the display of a corresponding geographic zone. Typically, it sends a corresponding description of each of the radials calculated for this request.

Each radial R is thus described with the data required for its representation in a display screen. It advantageously includes geo-referencing data. As an example, the display data associated with a radial R can include (FIGS. 8a, 8b):

its origin O, typically the position $p_0$ of the aircraft or a reference position common to all the radials
  The angular orientation $\phi_{GN}$ of the radial relative to geographic north NG, for geo-referencing
  The angular aperture of the radial
  The number N of points on the radial
  The distance of the first point $P1_r$ calculated
  The distance of the last point $PN_r$ calculated
  The display values of the successive points $P1_r$ to $PN_r$, on the radial.

Figure 3B:
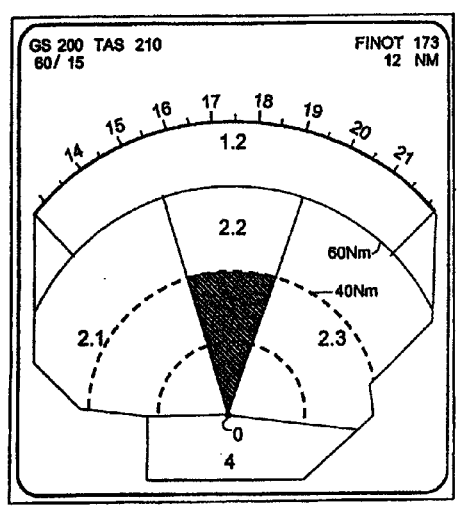
FIGS. 3b, 3c illustrate the individual zones to be mapped according to specific frequencies and priorities, and a graphic display on a screen of the terrain map data obtained.
Figure 3C:
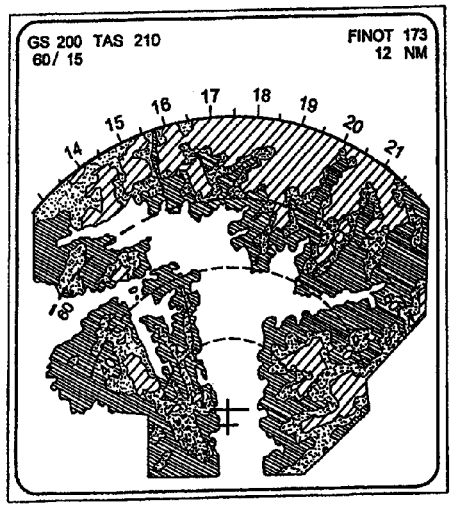

A data processing method according to the invention provides for measurable improvements compared to the existing devices. Notably:

with equivalent digital processing capacity, a given individual zone can be processed with a higher update frequency (for example the individual zone 3 of the forward segment as illustrated in FIG. 3).
  with the same update frequency, a given individual zone requires less in the way of processing resources (CPU resources) since it is defined with radials whose angular aperture is strictly adapted to the need as illustrated in FIGS. 7a and 7b.
  with equivalent update frequency and data processing capacity, a given individual zone can be processed with a better resolution of the data. As seen in relation to FIGS. 5a and 5b, with constant radial aperture angle APErad and smaller distance to the point on the radial, the resolution RESmin is also lower.
  an optimization of the geographic processing area to correspond to the strict requirement of a map-type presentation application, compared to the state of the art requiring a uniform calculation zone over 360°.
  an updating of the graphic data in accordance with the operational requirement.
  an improvement in the consistency of the geographic display with the other graphic elements geographically referenced and shifted in real time by the display management system, by improving the update frequency of the most useful data according to the operational situation of the aircraft.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A method of processing topographic data of an operating zone of an aircraft in real time, to display said operating zone in map form on a screen, said processing method comprising:
  calculating radials centered on a reference point defining an angular segment of topographic data,
  subdividing the operating zone to be mapped into a plurality of sections of angular segments, each forming an individual zone to be mapped, and
  assigning a priority and of a refresh frequency specific to each individual zone defined according to a criterion of operational interest of an element to the aircraft.

2. The method according to claim 1, comprising geo-referencing of each individual zone.

3. The method according to claim 2, wherein said geo-referencing is obtained by determining, for each of the radials to be calculated for the individual zone, the value of the angle of the radius with a geo-referenced direction.

4. The method according to claim 3, wherein said geo-referencing of an individual zone is obtained by determining geo-referencing coordinates of each of the points forming the peaks of the segment section defining said individual zone.

5. The method according to claim 1, wherein a segment section associated with an individual zone has a geometry that is variable in time, defined according to flight parameter(s) comprising the speed of movement and the rotation speed of the aircraft.

6. The method according to claim 1, wherein each individual zone has an angular aperture of the radials to be calculated for said zone made to correspond to it.

7. The method according to claim 1, wherein tasks associated with the calculation of the radials of the individual zones are managed by means of queues, a queue handling tasks of the same refresh frequency, according to their priority.

8. The method according to claim 1, wherein each individual zone has associated with it a larger associated calculation zone, in order to provide, for this individual zone, data in geographic overlap zones between individual zones, said calculation zone being defined according to flight parameters of the aircraft, in particular its heading and its speed.

9. The method according to claim 1, in which the topographic data is data of terrain elevation type supplied by a database that is onboard or accessible onboard.

10. The method according to claim 1, in which the topographic data is meteorological type data.

11. The method according to claim 2, wherein a segment section associated with an individual zone has a geometry that is variable in time, defined according to flight parameter(s) comprising the speed of movement and the rotation speed of the aircraft.

12. The method according to claim 2, wherein each individual zone has an angular aperture of the radials to be calculated for said zone made to correspond to it.

13. The method according to claim 3, wherein each individual zone has an angular aperture of the radials to be calculated for said zone made to correspond to it.

14. The method according to claim 2, wherein tasks associated with the calculation of the radials of the individual zones are managed by means of queues, a queue handling tasks of the same refresh frequency, according to their priority.

15. The method according to claim 3, wherein tasks associated with the calculation of the radials of the individual zones are managed by means of queues, a queue handling tasks of the same refresh frequency, according to their priority.

16. The method according to claim 4, wherein tasks associated with the calculation of the radials of the individual zones are managed by means of queues, a queue handling tasks of the same refresh frequency, according to their priority.

17. The method according to claim 2, wherein each individual zone has associated with it a larger associated calculation zone, in order to provide, for this individual zone, data in geographic overlap zones between individual zones, said calculation zone being defined according to flight parameters of the aircraft, in particular its heading and its speed.

18. The method according to claim 3, wherein each individual zone has associated with it a larger associated calculation zone, in order to provide, for this individual zone, data in geographic overlap zones between individual zones, said calculation zone being defined according to flight parameters of the aircraft, in particular its heading and its speed.

19. The method according to claim 4, wherein each individual zone has associated with it a larger associated calculation zone, in order to provide, for this individual zone, data in geographic overlap zones between individual zones, said calculation zone being defined according to flight parameters of the aircraft, in particular its heading and its speed.

20. The method according to claim 2, in which the topographic data is data of terrain elevation type supplied by a database that is onboard or accessible onboard.

21. The method according to claim 3, in which the topographic data is data of terrain elevation type supplied by a database that is onboard or accessible onboard.

22. The method according to claim 4, in which the topographic data is data of terrain elevation type supplied by a database that is onboard or accessible onboard.

* * * * *